Feb. 5, 1946. E. T. ARTERS 2,393,949
CONTROL SYSTEM
Filed Nov. 20, 1943
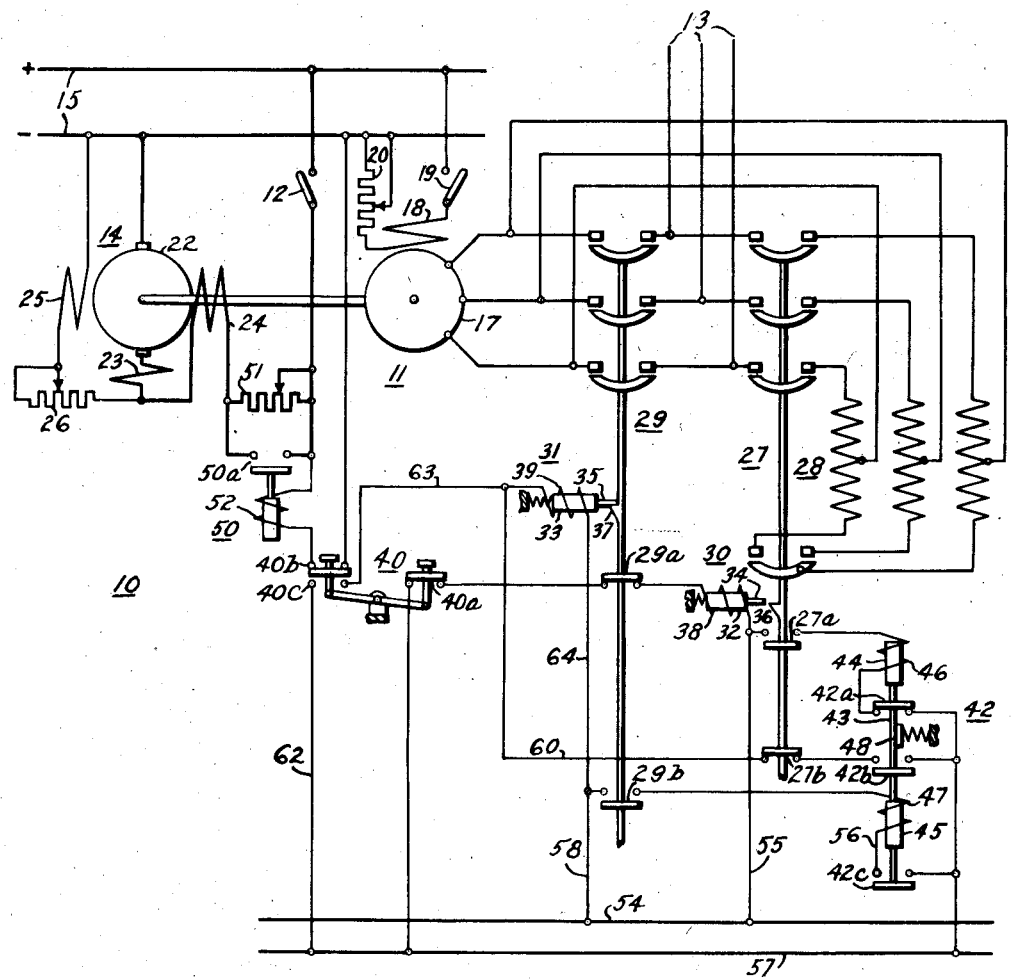
WITNESSES:
Alice L. Howell
F. V. Giolma
INVENTOR
Edward T. Arters.
BY
Ed Crawford
ATTORNEY Patented Feb. 5, 1946

2,393,949

UNITED STATES PATENT OFFICE 2,393,949

CONTROL SYSTEM

Edward T. Arters, Pittsburgh, Pa., assignor to Westinghouse Electric Corporation, East Pittsburgh, Pa., a corporation of Pennsylvania Application November 20, 1943, Serial No. 511,063

5 Claims. (Cl. 171—118)

My invention relates generally to control systems and has reference in particular to control systems for motor-generator sets.

Generally stated, it is an object of my invention to provide a control system for operating a motor-generator set from either end, which control system shall be simple and inexpensive to manufacture and easy to operate.

More specifically, it is an object of my invention to provide for operating an alternating-current, direct-current, motor-generator set from either the alternating-current end or the direct-current end and insure making predetermined connections for operating under the different conditions.

Another object of my invention is to provide a flexible and safe starting system for a motor-generator set.

Yet another object of my invention is to provide for so interlocking the starting and running switches of an alternating-current motor in a motor-generator set that the switches may be operated only in predetermined sequences when the set is operated as a direct-current or an alternating-current source.

It is also an object of my invention to provide for controlling the operation of lock means on the starting and running switches of the alternating-current end of a synchronous motor-generator set so that the alternating-current end may be operated either as a motor or a generator.

Other objects will in part be obvious, and will in part be explained hereinafter.

In practicing my invention, electrical interlocks are provided for normally preventing closure of the starting and running switches of the alternating-current machine of a motor-generator set. A transfer switch operable to "motor" or "generator" positions cotnrols the operation of the interlocks to determine whether the starting or running switch may be closed first. A transition relay energized through auxiliary contacts of the starting and running switches operates the interlock on the running switch when the starting switch is opened, thus permitting the running switch to be closed.

For a more complete understanding of the nature and scope of my invention, reference may be made to the following detailed description which may be read in connection with the accompanying drawing, in which the single figure is a diagrammatic view of a motor-generator power system embodying the principal features of the invention.

Referring to the single figure of the drawing, the reference numeral 10 may denote, generally a power system including a motor-generator set wherein an alternating current machine 11 may be normally energized from an alternating-current power system through conductors 13 for operating a direct-current machine 14 as a generator for supplying power to a direct-current system through conductors 15.

The alternating current machine 11 may, for example, be of the synchronous type having a stator winding 17 disposed to be connected to the alternating-current system, and a direct-current field winding 18 which may be connected to a direct-current source through a suitable field switch 19. A rheostat 20 may be provided for controlling the excitation of the field winding 18.

The direct-current machine 14 may be of any suitable type comprising, for example, an armature 22 having a commutating winding 23 and a series field winding 24 connected in series circuit relation therewith. A switch 12 may be provided for connecting the machine 14 to the conductors 15. A shunt field winding 25 may be provided having a field rheostat 26 for controlling the energization thereof.

In order to control the operation of the alternating-current machine 11 as a motor, a starting switch 27 may be provided for initially connecting the stator winding 17 to the conductors 13 through voltage reducing means such as the autotransformer 28 for starting the machine. A running switch 29 may be provided for connecting the stator winding 17 directly to the conductors 13 under running conditions.

With a view to controlling the sequence of operation of the starting and running switches 27 and 29, respectively, interlocks 30 and 31 may be provided comprising, for example, armatures 32 and 33 having lock members 34 and 35, respectively, for normally engaging latch means 36 and 37 on the switches for preventing their closure. operating windings 38 and 39, respectively, may be provided for actuating the armatures 32 and 33 to release the starting and running switches for closure either manually or by other suitable operating means (not shown).

In order to provide for controlling the operation of the switches either for starting the alternating-current machine 11 as a motor from the alternating-current system to drive the direct-current machine 14 as a generator, or for connecting the alternating-current machine to the alternating-current system for operation as a generator driven by the direct-current machine 14 operating as a motor, a transfer switch 40 may be provided for determining which of the interlocks 30 and 31 shall be energized initially. A transition relay 42 may be utilized to control the energization of the interlock 31 subsequent to operation of the starting switch 27. The transition relay 42 may comprise an operating member 43 having a plurality of auxiliary contact members operatively connected thereto and provided with upper and lower armatures 44 and 45 for actuating the relay to different operating positions. Operating windings 46 and 47 may be provided for actuating the armatures in opposite directions. This relay may also include a spring-actuated stop member 48 for retaining the operating member 43 in either position to which it may have been operated by one of the operating windings being energized until the other operating winding is subsequently energized.

With a view to controlling the connections of the direct-current machine 14 of the motor-generator set to the direct-current system for operation either as a generator or a motor, means such as the control switch 50, may be provided. For example, the armature 22 may be normally connected to the direct-current conductors 15 through a starting device, such as the starting rheostat 51, and the control switch 50 may be disposed to shunt the starting rheostat 51 to provide for direct connection of the armature 22 to the direct-current conductors 15 when the machine 14 is to be operated as a generator. Operation of the control switch 50 may be effected in any suitable manner, such as, for example, by means of a control circuit which provides for energization of the operating winding 52 thereof through auxiliary contact members of the transfer switch 40.

When it is desired to operate the motor-generator set from the alternating-current end, the transfer switch 40 may be operated to the "motor" position, as shown, to close contact members 40a to complete an energizing circuit for the operating winding 38 of the interlock 30 from the control buses 54 and 57 so as to release the lock member 34 of starting switch 27. The running switch 29 is inoperative because the operating winding 39 of the interlock 31 is deenergized, contact members 40c and 42b being open. The starting switch 27 may then be closed in any suitable manner to connect the stator winding 17 to the alternating-current system through the voltage reducing auto-transformer 28 and conductors 13.

As soon as the starting switch 27 is closed, the operating winding 46 of the transition relay 42 is energized through a circuit extending from the control bus 54 through conductor 55, auxiliary contact members 27a of the starting switch 27, operating winding 46, auxiliary contact member 42b of the transition relay, and conductor 56 to the other control bus 57. Upon operation of the transition relay 42 its operating winding 46 is deenergized through the opening of its contact members 42a. The operating member 43 is retained in the operated position by the stop member 48 even though the operating winding 46 is deenergized. Operation of the transition relay 42 also sets up an energizing circuit for the operating winding 39 of the interlock 31 through contact members 42b. This energizing circuit cannot, however, be completed until the starting switch 27 is opened, since the energizing circuit must be completed through the auxiliary contact members 27b of the starting switch.

As soon as the starting switch is opened, the operating winding 39 is energized through the circuit extending from the control bus 54 through conductor 58, operating winding 39, conductor 60, contact members 27b and contact members 42b to the other control bus 57. The armature 33 of the interlock 31 is thereby actuated to release the lock member 35 of the running switch 29 for connecting the stator winding 17 directly to the alternating-current system through the conductors 13. The starting switch 27 is locked in the open position by deenergization of the interlock operating winding 38 through opening of contact member 29a when the running switch 29 closes. At the same time the transition relay 42 operates to the lower position through energization of the operating winding 47 through closure of contact members 29b, interrupting its own energizing circuit through the opening of contact members 42c. The interlock control circuits are thereby set up for a subsequent operation of the starting and/or running switches.

With the transfer switch 40 in the "motor" position as shown for operating the alternating-current machine 11 as a synchronous motor, its auxiliary contact members 40b are in the closed position. With the switch 12 closed an energizing circuit is thereby completed for the operating winding 52 of the control switch 50 from the direct-current system or some other suitable source, so that the control switch is actuated to the closed position, connecting the direct-current machine 14 directly to the conductors 15 through contact members 50a, thereby shunting the starting rheostat 51.

When it is desired to operate the motor-generator set from the direct-current end, the transfer switch 40 is operated to the "generator" position so that its contact members 40c are closed. An energizing circuit is thereby completed for the operating winding 39 of the interlock 31 from the direct-current control bus 57 through conductor 62, contact members 40c, conductor 63, operating winding 39, and conductor 64 to the other control bus 54. The armature 33 is thereby actuated to release the running switch 29 for closure so that the alternating-current machine 11 may be connected directly to the alternating-current system through conductor 13 for operation as a generator. Since the contact members 40a are open, the operating winding 38 of the interlock 30 is deenergized. The starting switch 27 is thereby locked open so that the generator 11 cannot be mistakenly connected to the source through the transformer 28.

When the transfer switch 40 is operated to the "generator" position, the auxiliary contact members 40b are open. Accordingly, the operating winding 52 of the control switch is deenergized and contact members 50a are open. The armature 22 of the direct-current machine is, therefore, connected to the direct-current system in series circuit relation with the starting rheostat 51 so that the direct-current machine 14 may be operated as a motor for driving the alternating-current machine.

From the above description and the accompanying drawing, it will be apparent that I have provided a simple and effective control system for an alternating-current, direct-current, motor-generator set which is simple and inexpensive to manufacture, and which is flexible and positive in its operation. The proper sequence of operation of the starting and running switches of the alternating-current machine may be definitely maintained whether the machine is operated as a generator or a motor. The proper connections of the direct-current machine are likewise insured for the corresponding connections of the alternating-current machine.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A control system for a motor-generator set arranged for connection to alternating- and direct-current systems for generating either alternating-current or direct-current energy comprising, direct current control means connecting the direct current end as a generator or a motor, switch means operable to apply a reduced alternating-current voltage to the alternating-current end from the alternating-current system, additional switch means operable to apply a normal alternating current voltage to the alternating-current end from the alternating-current system, control means normally operable to prevent closure of either of the switch means, and additional control means including a manually operable transfer switch selectively controlling the direct current control means and relay means cooperative with the transfer switch operable in response to predetermined operations of the switch means to provide operating circuits for selectively affecting operation of the control means to permit different predetermined operations of the switch means.

2. A control system for an alternating-current, direct-current, motor-generator set which is disposed to be operated inversely comprising, direct current control means operable to provide for connecting the direct current end indirectly or directly to a direct current circuit, a starting switch operable to connect the alternating-current end of the set to an alternating-current system through voltage reducing means for starting, lock means preventing closure of the starting switch, a running switch operable to connect the alternating-current end directly to the alternating-current system, lock means preventing closure of the running switch, operating circuits for actuating said lock means to release said switches, control switch means manually operable to selectively complete said operating circuits to operate one or another of the lock means and permit closure of its associated switch means and connect the direct-current control means for selective operation, and circuit means including means operable in response to operations of the starting and running switches to provide different operating circuits for controlling the operation of the lock means.

3. A control system for an alternating-current, direct-current, motor-generator set having starting and running switch means for connecting the alternating-current end to an alternating-current source through voltage reducing means or directly comprising, lock means preventing closure of the starting and running switch means, control switch means selectively operable to predetermine which one of the lock means shall operate to release its respective switch means for closure, and relay means operable to different predetermined positions dependent on the positions of the switch means for determining whether the other of the lock means shall operate to release its switch means for closure subsequent to closure of the said one switch means.

4. A control system for an alternating-current machine disposed to be selectively operated as a motor or a generator comprising, a starting switch for connecting the machine to an alternating-current source through voltage-reducing means for starting as a motor, a running switch for connecting the machine to the alternating-current system as a motor or a generator at full voltage, electromagnetic lock means normally preventing closure of each of the switch means, a control switch selectively operable to different positions to effect energization of the lock means of the starting or running switches, and a control relay having a pair of opposing operating windings energized to operate the relay to predetermined positions in response to closure of the starting and running switches for controlling the energization of the running switch lock means after the starting switch means operates.

5. A control system for an alternating-current machine disposed to be selectively operated as a motor or a generator and having starting and running switch means for connecting the machine to an alternating-current system through voltage reducing means or directly comprising, lock means normally preventing closure of the switch means and operable to release the switch means for closure, a control switch operable to motor or generator positions and having a plurality of contact members, circuit means including contact members of the control switch closed in the generator position connecting the lock means of the running switch for operation, additional circuit means including different contact members of the control switch closed in the motor position connecting the lock means of the starting switch for operation, a relay operable to different predetermined positions in response to operation of the switch means, and circuit means controlled by the relay and the starting switch connecting the lock means of the running switch means for operation only after the starting switch is operated.

EDWARD T. ARTERS.